United States Patent
Bhalodi et al.

(10) Patent No.: US 9,531,292 B2
(45) Date of Patent: Dec. 27, 2016

(54) ARRANGEMENT, METHOD AND COMPUTER PROGRAM PRODUCT CONCERNED WITH TAPPING OF POWER FROM A DC POWER LINE TO AN AC POWER LINE

(71) Applicant: ABB Technology Ltd, Zürich (CH)

(72) Inventors: Kalpesh Hirjibhai Bhalodi, Bangalore (IN); Lennart Harnefors, Eskilstuna (SE); Sasitharan Subramanian, Ludvika (SE); Tomas Jonsson, Linköping (SE)

(73) Assignee: ABB TECHNOLOGY LTD, Zürich (DE)

( * ) Notice: Subject to any disclaimer, the term of this patent is extended or adjusted under 35 U.S.C. 154(b) by 0 days.

(21) Appl. No.: 14/897,758

(22) PCT Filed: Jun. 14, 2013

(86) PCT No.: PCT/EP2013/062424
§ 371 (c)(1),
(2) Date: Dec. 11, 2015

(87) PCT Pub. No.: WO2014/198343
PCT Pub. Date: Dec. 18, 2014

(65) Prior Publication Data
US 2016/0118908 A1    Apr. 28, 2016

(51) Int. Cl.
*H02M 7/219* (2006.01)
*H02M 7/217* (2006.01)
(Continued)

(52) U.S. Cl.
CPC ............. *H02M 7/217* (2013.01); *H02M 7/483* (2013.01); *H02M 7/219* (2013.01); *H02M 2001/0074* (2013.01); *H02M 2007/4835* (2013.01)

(58) Field of Classification Search
CPC .. H02M 7/219; H02M 1/4208; H02M 1/4233; H02M 5/4585; H02M 7/217
(Continued)

(56) References Cited

U.S. PATENT DOCUMENTS

| 6,266,259 | B1 * | 7/2001 | Franck | H02M 7/538 |
| | | | | 363/132 |
| 6,519,169 | B1 * | 2/2003 | Asplund | H02M 7/48 |
| | | | | 363/132 |

(Continued)

FOREIGN PATENT DOCUMENTS

| EP | 2 530 816 A2 | 12/2012 |
| KR | 10-2010-0098471 A | 9/2010 |

(Continued)

OTHER PUBLICATIONS

Vasiladiotis et al., "Power and DC Link Voltage Control Considerations for Indirect AC/AC Modular Multilevel Converters", Proceedings of the 2011-14th European Conference on Power Electronics and Applications (EPE 2011), Aug. 30, 2011, pp. 1-10.

Primary Examiner — Timothy J Dole
Assistant Examiner — Bryan R Perez
(74) Attorney, Agent, or Firm — Birch, Stewart, Kolasch & Birch, LLP (57) ABSTRACT

An arrangement for tapping power from a DC power line to an AC power line includes power transfer modules between two DC potentials, each including a first branch with a string of converter cells in parallel with a second branch including a capacitor and being connected to an AC phase. There is at least one control unit that controls the arrangement considering one or more of a) distributing appropriate AC and DC voltages in converter output voltages of all series connected modules, b) maintaining/setting cell capacitor voltages in specific range and allowing boost mode operation, c) performing possible balancing of the introduced capacitor and d) employing an alternate approach of using passive filters to mitigate low order harmonics.

20 Claims, 6 Drawing Sheets

(51) Int. Cl.
*H02M 7/483* (2007.01)
*H02M 1/00* (2006.01)

(58) Field of Classification Search
USPC ........ 363/44, 52, 53, 84, 114, 116, 125–127
See application file for complete search history.

(56) References Cited

U.S. PATENT DOCUMENTS

| | | | |
|---|---|---|---|
| 6,721,191 B2* | 4/2004 | Duerbaum | H02M 3/33561 363/127 |
| 7,518,893 B2* | 4/2009 | Ponnaluri | H02M 1/12 363/163 |
| 8,018,331 B2 | 9/2011 | Jang | |
| 8,345,455 B2 | 1/2013 | Jeon | |
| 2008/0130335 A1* | 6/2008 | Yuzurihara | H02M 7/125 363/125 |
| 2012/0314466 A1 | 12/2012 | Goerges et al. | |
| 2013/0070495 A1 | 3/2013 | Jonsson et al. | |
| 2013/0208521 A1* | 8/2013 | Trainer | H02J 3/36 363/126 |

FOREIGN PATENT DOCUMENTS

| WO | WO 2011/098100 A1 | 8/2011 |
|---|---|---|
| WO | WO 2011/141059 A1 | 11/2011 |
| WO | WO 2012/048754 A1 | 4/2012 |

\* cited by examiner

ARRANGEMENT, METHOD AND COMPUTER PROGRAM PRODUCT CONCERNED WITH TAPPING OF POWER FROM A DC POWER LINE TO AN AC POWER LINE

FIELD OF INVENTION

The present invention generally relates to voltage source converters. More particularly the present invention relates to an arrangement for tapping power from a DC power line to an AC power line as well as to a method and computer program product for controlling a power transfer module of such an arrangement for converting between AC and DC.

BACKGROUND

Direct Current (DC) power transmission systems are of interest to use in various situations, for instance when transferring electrical power over long distances. High Voltage Direct Current (HVDC) transmission of power has proved to be an efficient alternative to Alternating Current (AC) transmission in many power transmission situations. Several HVDC transmission lines may furthermore be interconnected to form an HVDC transmission network.

A so-called tapping converter is known to tap power from a DC power line to a three-phase alternating current (AC) power line with the three phases connected in series between the DC power line and ground or a negative DC bus. Each phase is then typically connected to a corresponding AC conductor via at least one transformer, which may be a three-phase transformer.

It is also of interest to connect a DC capacitor in series with the secondary winding of the transformer in some instances. This has the advantage of blocking DC voltages.

An arrangement for tapping power comprising such a DC capacitor is for instance known from US 2013/0070495.

It is of interest to provide a tapping converter that considers one or more of the following objectives:
1) Distribute appropriate AC and DC voltages in converter output voltages of all series connected phases
2) Maintain/set cell capacitor voltages in specific range and allow boost mode operation, where sum of all cell voltages are more than the DC potential,
3) The voltage across the introduced capacitor (DC blocking capacitor) may need to be balanced.
4) Alternate approach of using passive filters to mitigate low order AC side and DC side converter generated harmonics.

SUMMARY OF THE INVENTION

The present invention addresses one or more of the above mentioned objectives.

One or more of the objectives is according to a first aspect of the present invention achieved through an arrangement for converting between alternating current, AC, and direct current, DC, the arrangement comprising: a number of power transfer modules connected in series between two DC potentials, where one DC potential is the voltage of a DC power line and each power transfer module comprises a first branch comprising a string of converter cells, the first branch being connected in parallel with a second branch comprising a capacitor and a secondary winding of a transformer, the primary winding of which is connected to a corresponding AC phase of an AC network, the arrangement further comprising at least one control unit comprising
an adding unit configured to
obtain an AC voltage reference and a DC dependent control contribution, said DC dependent control contribution being based on a DC voltage term depending on the number of power transfer modules and on the difference between the two DC potentials, and
add the DC dependent control contribution to the AC voltage reference for forming a first control expression, and
a dividing unit configured to
obtain the first control expression,
obtain a cell voltage reference sum for use in a second control expression, and
divide the first control expression with the second control expression in order to obtain a reference voltage signal for use in controlling the cells of the string of a corresponding power transfer module.

One or more of the objectives are according to a second aspect of the present invention achieved through a method of controlling a power transfer module for converting between alternating current, AC, and direct current, DC, the power transfer module being a power transfer module in a group of power transfer modules connected in series between two DC potentials, where one DC potential is the voltage of a DC power line and each power transfer module comprises a first branch comprising a string of converter cells, the first branch being connected in parallel with a second branch comprising a capacitor and a secondary winding of a transformer, the primary winding of which is connected to a corresponding AC phase of an AC network, the method comprising:
obtaining an AC voltage reference,
obtaining a DC dependent control contribution, said DC dependent control contribution being based on a DC voltage term depending on the number of power transfer modules and the difference between the two DC potentials,
adding the DC dependent control contribution to the AC voltage reference for forming a first control expression,
obtaining a cell voltage reference sum for use in a second control expression,
dividing the first control expression with the second control expression for obtaining a reference voltage signal, and
controlling the cells of the string of the power transfer module using the reference voltage signal.

One or more of the objectives are according to a third aspect of the present invention achieved through a computer program product for controlling a power transfer module for converting between alternating current, AC, and direct current, DC, the power transfer module being a power transfer module in a group of power transfer modules connected in series between two DC potentials, where one DC potential is the voltage of a DC power line and each power transfer module comprises a first branch comprising a string of converter cells, the first branch being connected in parallel with a second branch comprising a capacitor and a secondary winding of a transformer, the primary winding of which is connected to a corresponding AC phase of an AC network, the computer program product comprising a data carrier with computer program code configured to cause a control unit to
obtain an AC voltage reference,
obtain a DC dependent control contribution, the DC dependent control contribution being based on a DC voltage term depending on the number of power transfer modules and the difference between the two DC potentials, add the DC dependent control contribution to the AC voltage reference for forming a first control expression, obtain a sum of cell capacitor voltage reference per power transfer module for use in a second control expression, divide the first control expression with the second control expression for obtaining a reference voltage signal, and control the cells of the string using said reference voltage signal.

The present invention has a number of advantages, some of which are given below:

1) Cell voltages may be set/maintained within specific range to reduce voltage rating of converter due to ripple voltages
2) a boost mode operation is also possible, where the sum of cell voltages is higher than the voltage difference and thereby also higher than the voltage on the DC power line. This results in reduced converter current and corresponding losses for specific load.
3) Voltage balancing of introduced capacitor ensures stable and balanced three-phase operation.

BRIEF DESCRIPTION OF THE DRAWINGS

The present invention will in the following be described with reference being made to the accompanying drawings, where FIG. 1 schematically shows a DC power transmission system comprising a DC power line between an inverter and a rectifier as well as an arrangement for tapping power from the DC power line to an AC power line, FIG. 2 schematically shows an arrangement from FIG. 1 in more detail, FIG. 3 schematically shows a first control section of a control unit for any one power conversion module in the arrangement in FIG. 2 for providing a control signal, FIG. 4 schematically shows a flow chart of a number of method steps being performed in the first control section in FIG. 3, FIG. 5 schematically shows an alternative first control section, FIG. 10 shows a fourth alternative arrangement, and FIG. 11 schematically shows a computer program product in the form of a data carrier comprising computer program code for implementing the control unit.

DETAILED DESCRIPTION OF THE INVENTION

In the following, a detailed description of preferred embodiments of the invention will be given.

Figure 1:
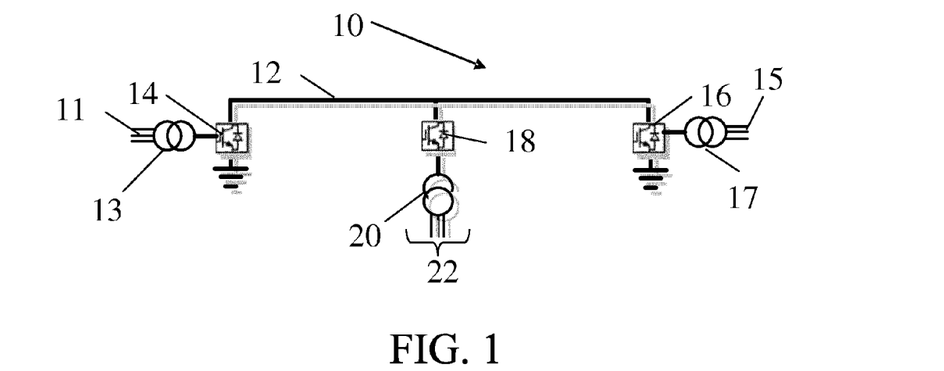

FIG. 1 shows a single line diagram of a simplified Direct Current (DC) power transmission system 10 comprising a first converter 14, a second converter 16 and a DC power line 12. The first converter 14 may here be connected to a first AC power line 11 via a transformer 13, which power line 11 may be part of a first alternating current (AC) power system where energy is generated and the second converter 16 may be connected to a second AC power line 15 via a transformer 17, which power line 15 may be a part of a second AC power system where energy is consumed.

The DC power line 12 may here be a power line covering a long distance for transferring power. One exemplifying distance is the distance of 500 km. It should here be realized that as an alternative, the DC power system 10 may include several more power lines and converters. The system may thus be a so-called DC grid as well. The DC power system is here a monopole system. It should however be realized that in some variations of the invention it is a bipole system instead, where there is a positive and negative DC bus.

To this DC power line 12 there is connected an arrangement for tapping power from the DC power line 12 to a further AC power line 22. The arrangement here comprises a conversion unit 18, being connected to the further AC power line 22 via a transformer 20, which transformer may be realized as a three-phase transformer and which further AC power line 22 is a three-phase power line and therefore comprises three phase conductors. The further power line may here be a part of a further AC power system. The conversion unit 18 and transformer here make up an arrangement for transmitting power between a DC power line and an AC power line according to the invention.

The power transmitted across the DC power line 12 may as an example be in the range of 12000 MW, at an exemplifying voltage level of 320 kV, while the power provided or used by the further AC power line 22 may be in the range of 200 MW or lower at an exemplifying voltage level of for instance 320 kV.

The further AC power system may as an example be the system of a city being passed by the first DC power line 12.

Because the power of this further AC system is lower than the power of the DC system 10, it is possible to have the phases of the AC system connected in series to the DC power line 12.

Figure 2:
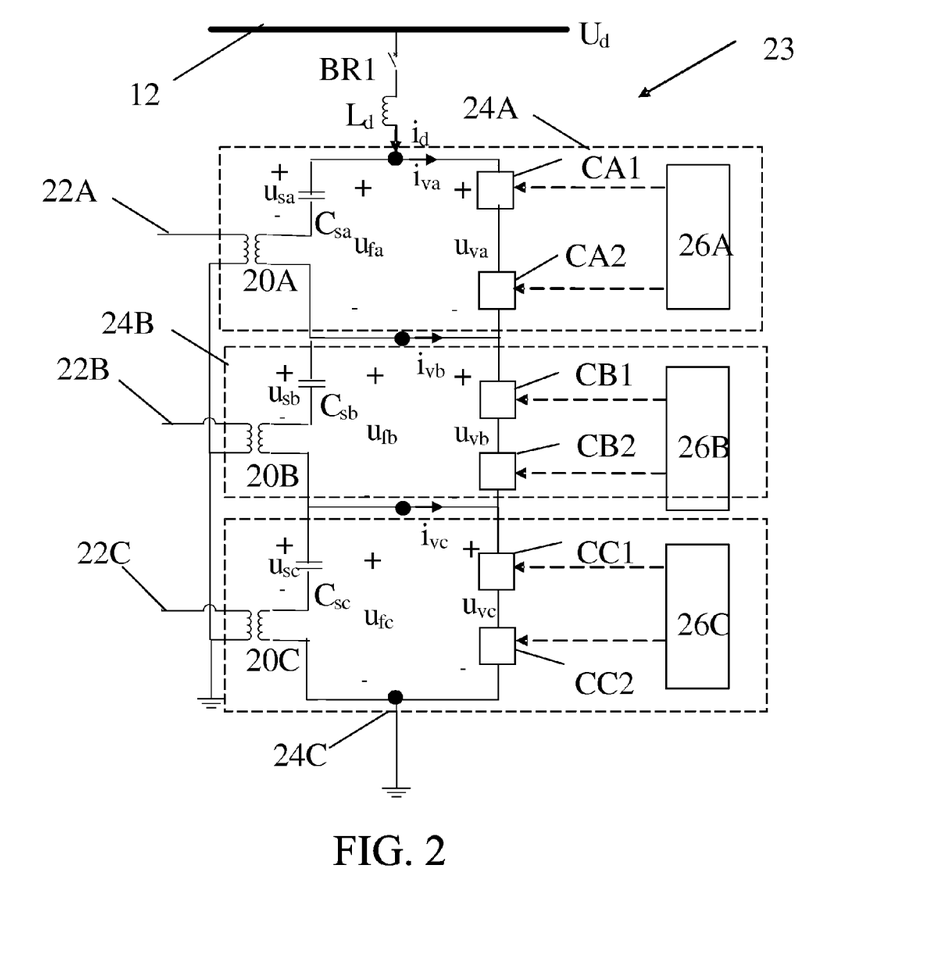

How this may be done is schematically shown in FIG. 2.

As the DC power system in this embodiment is a monopole system, the arrangement 23 comprises a number or a group of power transfer modules 24A, 24B and 24C connected between the DC power line 12 and ground. The number may be at least two.

Here there is one module for each phase. There are thus three modules. The modules are furthermore connected in series between the DC power line 12 and ground. In a bipole system these modules would be connected in series between the DC power line and a negative DC bus. It can thus be seen that the group of power transfer modules are connected in series between two DC potentials, where one DC potential is the voltage Ud of the DC power line 12 and the other is ground or the potential of a negative DC bus.

In FIG. 2 there is also a first circuit breaker BR1, a DC circuit breaker, which is at one end connected to the DC power line 12 and at the other connected to a first reactor $L_d$, which first reactor $L_d$ is connected to a first of the modules 24A. Both the first reactor $L_d$ and first circuit breaker BR1 are optional.

Each module here comprises a first branch including a string of series connected converter cells and a second branch comprising a DC capacitor and a secondary winding of a phase transformer, where the second branch is connected in parallel with the first branch. The phase transformer may be the three-phase transformer of FIG. 1. Each module also comprises a primary winding of the phase transformer, which is connected to a corresponding phase conductor of the AC power line.

The first branch of the first module 24A thus includes a string of series connected converter cells CA1, CA2 and a second branch comprising a DC capacitor $C_{SA}$ connected in series with a secondary winding of a first phase transformer 20A, where the second branch is connected in parallel with the first branch. The string of converter cells CA1 and CA2 in the first branch also form a first phase leg. A first end of the first branch is furthermore connected to the first reactor $L_d$ as is a first end of the second branch. A first end of a primary winding of the first phase transformer 20A is connected to a first phase conductor 22A of the AC power line 22 and a second end of this primary winding of the first phase transformer 20A is connected to ground. It can in this way be seen that the second branch is coupled to the first pages conductor 22A. A second end of the first branch of the first module 24A is connected to a first end of the first branch of the second module 24B and to a first end of the second branch of the second module 24B. Also a second end of the second branch of the first module 24A is connected to the first end of the first branch of the second module 24B and to the first end of the second branch of the second module 24B.

The first branch of the second module 24B also includes a string of series connected converter cells CB1, CB2 and a second branch comprising a DC capacitor $C_{SB}$ connected in series with a secondary winding of a second phase transformer 20B, where the second branch is connected in parallel with the first branch. The string of converter cells CB1 and CB2 also form a second phase leg. A first end of a primary winding of the second phase transformer 20B is connected to a second phase conductor 22B of the AC power line 22 and a second end of this primary winding of the second phase transformer 20B is connected to ground. A second end of the first branch of the second module 24B is connected to a first end of the first branch of the third module 24C and to a first end of the second branch of the third module 24C. Also a second end of the second branch of the second module 24B is connected to the first end of the first branch of the third module 24C and to the first end of the second branch of the third module 24C.

The first branch of the third module 24C thereby also includes a string of series connected converter cells CC1, CC2 and a second branch comprising a DC capacitor $C_{SC}$ connected in series with a secondary winding of a third phase transformer 20B, where the second branch is connected in parallel with the first branch. The string of converter cells CC1 and CC2 also form a third phase leg. A first end of a primary winding of the third phase transformer 20C is connected to a third phase conductor 22C of the AC power line 22 and a second end of this primary winding of the third phase transformer 20C is connected to ground. A second end of the first branch of the third module 24C and a second end of the second branch of the third module 24C are both connected to ground.

Since the second ends of all the primary windings are connected to ground these primary windings are thereby star connected. If seen as a three-phase transformer, it can thus be seen that it is star or wye connected on the primary side.

It should also be realized that the number of cells in a string may be considerably higher than the two shown.

Each module is furthermore provided with a control unit 26 for controlling the cells. There is thus a first control unit 26A for the cells CA1 and CA2 in the first module 24A, a second control unit 26B for the cells CB1 and CB2 in the second module 24B and a third control unit 26C for the cells CC1 and CC2 in the third module 24C.

The control unit of a power transfer module typically uses pulse width modulation (PWM) control. The PWM control may involve comparing a voltage reference signal with a triangular carrier signal. Each time the voltage reference signal crosses the triangular carrier signal, a switching state is changed. A cell may go from providing a voltage contribution of a cell capacitor or zero. In one variation there are provided a number of such triangular carrier signals displaced in time from one another, where there is one triangular carrier signal for each cell. When a voltage reference signal crosses the triangular carrier signal, then the corresponding cell is switched. This is as such not new.

The above-mentioned pulse width modulation control may be provided for each phase leg or each string of cells.

The voltage reference is typically provided as a wave form that is desired on the AC side, which may be a waveform resembling a sine way.

However, due to ageing of capacitors, capacitance value mismatch between different modules and different tolerance of capacitance for different capacitors of different modules, the voltage across different DC blocking capacitors may not be balanced. Hence, voltage balancing of the DC blocking capacitor, should also be considered in the control.

Figure 3:
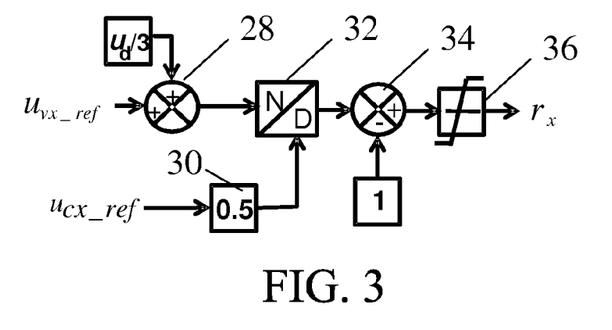

A first control section of the control unit of a power transfer module provided for handling this situation is schematically shown in FIG. 3. In the figure the index x is used. x can here have the values a, b, c, where a indicates the first module, b the second module and c the third module. A first control section of FIG. 3 may thus be provided in each control unit shown in FIG. 2.

In the first control section, there is a first adding unit 28 which has a first input on which it receives a first voltage reference $u_{vx\_ref}$ and a second input on which it receives a DC voltage term $u_d/3$. The first voltage reference $u_{vx\_ref}$ is typically an AC voltage that the cells of the phase leg of the corresponding module are to be switched for forming.

The first adding unit 28 is connected to a numerator input N of a dividing unit 32. There is also a multiplying unit 30, which has an input on which a cell voltage reference sum $u_{cx\_ref}$ is supplied. More particularly, the signal $u_{cx\_ref}$ is a sum of the cell voltage references used in the module x. In relation to the first phase leg $u_{cx\_ref}$ is thus made up of the cell voltage references provided for the cells CA1 and CA2 in the first branch. The output of the multiplying unit 30 is connected to a denominator input D of the dividing unit 32. The dividing unit 32 has an output, which is connected to a first input of an optional first subtracting unit 34. The first subtracting unit 34 has a negative input receiving a value of one. An output of the first subtracting unit 34 is connected to a range limiter 36, which in turn provides a reference voltage signal $r_x$. Also the range limiter 36 is optional, which means that in some variations the dividing unit 32 provides the reference voltage signal and in other variations the first subtracting unit 34 provides the reference voltage signal $r_x$.

Figure 4:
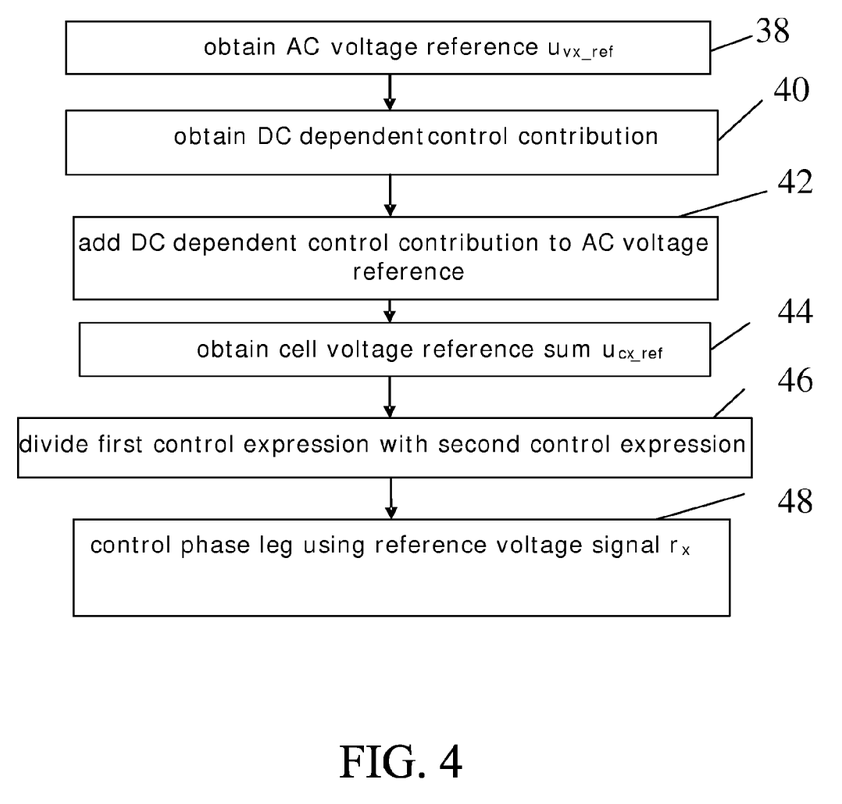

The functioning of the first embodiment will now be described with reference also being made to FIG. 4, which shows a flow chart of the method steps being performed by the first control section.

The first adding unit 28 obtains the first voltage reference $u_{vx\_ref}$ step 38, which is a voltage reference for use in the forming of a waveform on the secondary winding of the corresponding phase transformer, i.e. an AC voltage forming reference. This may be a conventional voltage reference resembling a sine wave without DC components.

The first adding unit 28 also obtains a DC dependent control contribution, step 40, which DC dependent control contribution is based on a DC voltage term that depends on the difference between the two DC potentials. In the monopole system, this means that the DC voltage term depends on the DC voltage between the DC power line and ground. It also depends on the number of phase legs or power transfer modules. In this first embodiment the DC dependent control contribution is the DC voltage term $U_d/3$. As there are three phase legs the DC voltage term will be the DC voltage $U_d$ of the DC line 12, which may be a cable, divided by three.

The first adding unit 28 then adds the DC dependent control contribution to the first voltage reference, step 42, in order to form a first control expression. This first control expression is then forwarded to the numerator input N of the dividing unit 32.

At the same time the multiplying unit 30 receives or obtains the cell voltage reference sum, $U_{cx\_ref}$, step 44, to be used in a second control expression. The cell voltage reference sum is a sum of cell capacitor voltage references provided for one phase or one power transfer module. The cell voltage reference sum is in this case multiplied by 0.5, i.e. divided by 2, and the result of the multiplication is provided to the denominator input D of the dividing unit 32. The reason for dividing by two is that each cell may have either of two states, either the voltage of the cell capacitor or zero. As an average half the cell capacitor voltage may be used. The dividing unit 32 then divides the first control expression with the second control expression, step 46, and the result of the division is provided to the first subtracting unit 34. The first subtracting unit 34 then subtracts the number of one from the result of the division. The result of the subtraction is then provided to a range limiter 36, which applies an input range limitation on the result of the subtraction, i.e. it limits the values in a certain range, for instance between a maximum and a minimum value. The signal obtained after the range limitation is then provided as a reference voltage signal $r_x$ that is used for controlling the converter and more particularly used for controlling the cells of the phase leg of the corresponding power transfer module. The cells of the power transfer module are thus controlled using the reference voltage signal $r_x$, step 48. The signal is more particularly provided as a control signal that is used in PWM control of these cells, i.e. in a comparison of the signal with a triangular carrier signal.

As is evident through the use of the index x, the control of each module is the same. However, there is a shift of 120 degrees between the different phases.

The control strategy may also be described in the following mathematical way:

The converter output voltage $u_{vx}$; x=a, b, c, of a power transfer module, i.e. the voltage provided by the string of cells of the module, include a DC component equal to $$\frac{u_d}{3}$$

and a fundamental frequency component equal to $u_{vx}^{(1)}$.

$$u_{vx} = \frac{u_d}{3} + u_{vx}^{(1)} = \sum_{i=1}^{N} \gamma_{ix} u_{cxi}; x = a, b, c \quad (1)$$

The switching variables of the individual cells $\gamma_{ix}$ (x=a, b and c) can be either 0 or 1 related to bypassed or inserted cells, resulting in a cell output voltage of either 0 or $u_{cxi}$ (x=a, b and c).

Considering the sum of the cell capacitor voltages:

$$u_{cx} = \sum_{i=1}^{N} u_{cxi}; x = a, b, c$$

and the average switching variable yields:

$$u_{vx} = \frac{u_d}{3} + u_{vx}^{(1)} = \gamma_x u_{cx}; x = a, b, c \quad (2)$$

Consequently the switching variable should equal:

$$\gamma_x = \frac{\frac{1}{3}u_d + u_{vx}^{(1)}}{u_{cx}} = \frac{\frac{1}{3}u_d + U_{vx}^{(1)}\cos(\omega_1 t)}{u_{cx}}; x = a, b, c \quad (3)$$

Considering a carrier going between −1 and 1 a new modulation reference is defined:

$$\gamma = \frac{1+r}{2}$$
$$r = 2\gamma - 1$$

Taking the cell voltage reference sum, i.e. the sum of cell capacitor voltage references per power transfer module, as a fixed reference, $u_{cx\_ref}$ and $U_{vx}^{(1)} \cos(\omega_1 t) = U_{vx\_ref}$, modulation reference, i.e. the control signal to be used, can be given by:

$$r_x = \frac{\frac{1}{3}U_d + U_{vx\_ref}}{\frac{1}{2}u_{cx\_ref}} - 1; x = a, b, c \quad (4)$$

$$r_x = m_{dc} + m_{ac}\cos(\omega_1 t) - 1$$

Here, DC and AC modulation ratio can be given by:

$$m_{dc} = \frac{\frac{1}{3}u_d}{\frac{1}{2}u_{cx}} \text{ and } m_{ac} = \frac{u_{vx}^{(1)}}{\frac{1}{2}u_{cx}};$$

$$m_{dc} + m_{ac} < 2$$

where $$m_{ac} < m_{dc}$$

In this way a voltage reference signal $r_x$ is obtained for use in PWM control of the series connected cells, which signals ensures that the DC voltage component of the phase valve unit is maintained equal to $U_d/3$ with a sinusoidal AC voltage component. Furthermore, a boost mode operation is also achieved, where the sum of cell voltages ($\Sigma U_{cx}$) is higher than the DC pole voltage ($U_d$), i.e. higher than the voltage on the DC power line. Each module typically provides a voltage of $2U_d/3$ and thereby the total level of $2U_d$ is obtained.

It is further possible that the first control section comprises a Pulse Width Modulation (PWM) block including a comparator, which compares the reference voltage signal $r_x$ with a triangular carrier signal to generate gate pulses for the converter switches of the cells in the corresponding power conversion module.

The control described above also has the further advantages. It provides fast and stable three-phase operation of the arrangement using series connected phases in the entire operating arrangement range.

It is possible to improve on the situation described above. A second embodiment is directed towards this situation.

Figure 5:
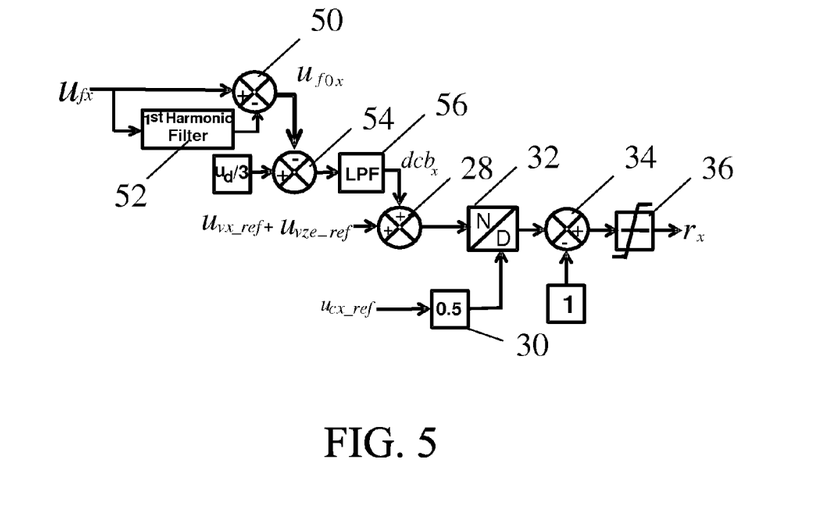

An alternative first control section according to the second embodiment is shown in FIG. 5.

The difference in relation to the control section in FIG. 3 is here that instead of directly supplying the DC voltage contribution $U_d/3$ to the second input of the first adding unit 28, the DC voltage contribution $U_d/3$ is processed for improving the DC voltage balancing. Therefore, there are two further subtracting units, a first further subtracting unit 50 and a second further subtracting unit 54. The first further subtracting unit 50 has a positive input on which it receives a voltage $u_{fx}$ and a negative input on which it is connected to a first order harmonic filter 52, The first harmonic filter 52 also receives the voltage $u_{fx}$. The voltage $u_{fx}$ is here the voltage across the second branch, i.e. across the secondary winding and DC blocking capacitor and x again used for denoting module a, b or c.

The first further subtracting unit 50 also has an output that is connected to a negative input of the second further subtracting unit 54. The second further subtracting unit 54 also has a positive input on which it receives the DC voltage contribution of $U_d/3$. The second further subtracting unit 54 has an output, which is connected to a low pass filter 56, which in turn is connected to the first adding unit 28 and provides a signal $dcb_x$ to the first adding unit 28. The first adding unit 28 also receives a zero sequence voltage reference $u_{vze\_ref}$ in addition to the first voltage reference $u_{vx\_ref}$.

The first further subtracting unit 50 obtains or receives the second branch voltage $u_{fx}$, i.e. the voltage across the second branch comprising DC capacitor and secondary winding. This voltage is also provided to the first harmonic filter 52, which filters away the fundamental frequency. The filtered voltage is then subtracted from the unfiltered voltage in the first further subtracting unit 50 and in this way a second branch voltage $u_{f0x}$ without fundamental frequency is obtained. The second branch voltage without fundamental frequency is then subtracted from the DC voltage term $U_d/3$ in the second further subtracting unit 54 and the result provided to the low pass filter 56. Thereby the difference between the DC voltage and the second branch voltage without fundamental frequency are provided as the DC dependent control contribution $dcb_x$ to the first adding unit 28.

In the first adding unit 28 the DC dependent control contribution $dcb_x$ is subtracted from a sum formed through the first reference voltage $u_{vx\_ref}$ and the zero sequence voltage reference $u_{vze\_ref}$.

The DC component in the feed forward voltage ($U_{fx}$; x=a, b, c), i.e. the voltage across the second branch should under ideal conditions be equal to $$\frac{U_d}{3}.$$

However, under unbalanced conditions when the DC blocking capacitor ($U_{sx}$) is not having a DC-voltage component equal to $$\frac{U_d}{3},$$

there will be a mismatch between the DC voltage components provided by the cells and the DC blocking capacitor. The following equation shall be satisfied for the DC voltage:

$$U_{fx}^{dc} - U_{sx}^{dc} = 0$$

$$U_{fa}^{dc} + U_{fb}^{dc} + U_{fc}^{dc} = U_d$$

Where $U^{dc}_{fx}$ is the DC voltage component of the voltage across the second branch and $U^{dc}_{sx}$ is the voltage across the capacitor $C_{sx}$.

As can be seen from the simplification above, it is possible to use $U_{f0x}$ in the balancing of the DC blocking capacitor voltage. DC blocking capacitor voltage balancing in steady state and during dynamic conditions is thus obtained. Balancing is also achieved when there are different capacitance values of the DC blocking capacitors due to aging or different tolerances. The feed forward voltage $u_{fx}$ is a part of current control. It is sensed for Phase Locked Loop (PLL) synchronization and current control. Replacement of $u_{sx}$ by $u_{fx}$ as explained above results in reduction of additional voltage sensors for sensing $u_{sx}$. The second embodiment provides improved control with respect to DC blocking capacitor voltage balancing control. Thereby all the phases have improved stability.

The structure described above may experience harmonics on both the AC as well as the DC side. Aspects of the invention are also directed towards mitigating such harmonics.

The topology shown in FIG. 2 would normally inject 3rd order harmonic component in DC side currents as well as in the AC side voltage. Each power transfer module is controlled to give an output voltage equal to $u_{vx}$. Due to ripple voltage obtained in each cell capacitor the output voltage will also contain harmonics in addition to the fundamental AC voltage.

Some ways to mitigate such harmonics is through the use of passive filters. However, they are bulky and need additional installation. There are furthermore maintenance costs associated with such filters.

Figure 6:
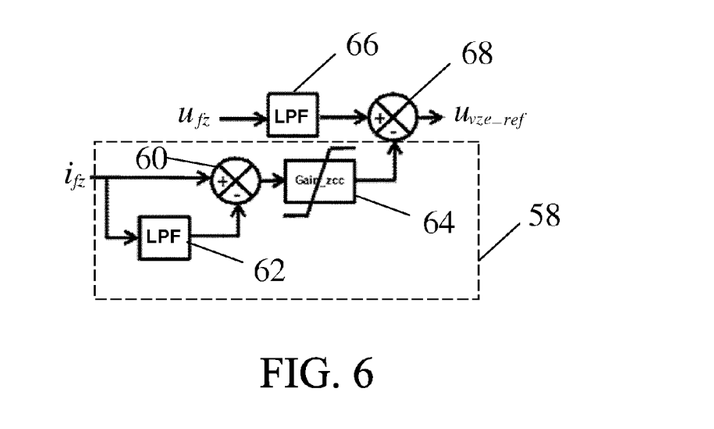
FIG. 6 shows a second control section.

One alternative way in which harmonic current limitation may be realized, which is implemented in a third embodiment, is through the use of a second control section in a control unit. A second control section may thus be provided in one or more of the control units of the arrangement. This second control section employs negative feedback of a 3rd order harmonic voltage term.

One realization of a second control section is shown in FIG. 6. There is here a processing unit 58 comprising a subtracting unit 60, a second low pass filter 62 and an amplifying unit 64 with a range limitation. The third further subtracting unit 60 has a positive input on which it receives a phase leg current and a negative input connected to the second low pass filter 62. The phase leg current, is the current running through the phase leg, i.e. through the cells of the power conversion unit. In this example it is furthermore the zero sequence component $i_{fz}$ of phase leg current that is considered. Thereby the phase leg current is a zero sequence current. The second low pass filter 62 also receives this current $i_{fz}$ and low pass filters it. The third further subtracting unit 60 then subtracts the low pass filtered zero sequence current from the zero sequence phase leg current $i_{fz}$. In this way a zero sequence phase leg current $i_{fz}$ is processed with negative feedback of the second low pass filter 62 that may have a cut-off frequency near the fundamental frequency, which eliminates DC and fundamental components from the current. The result of the subtraction is then provided to the amplifying unit 64, which amplifies the difference current with a Gain corresponding to the impedance of the phase leg, thereby obtaining a third control term only based on harmonic components of the phase leg current. Gain_zcc (impedance equivalent) is thus multiplied with the output from the subtracting unit 60 to avail negative feedback of a 3rd order harmonic voltage term. The third control term thus provides a voltage drop of the phase leg that is dependent on the harmonic components of the zero sequence phase leg current. This third control term is then provided to the negative input of a fourth further subtracting unit 68, which fourth further subtracting unit 68 has a positive input, which is connected to a third low pass filter 66. This third low pass filter 66 receives or obtains a second branch voltage, which in this example is the zero sequence component of the second branch voltage $u_{fz}$ of the second branch, i.e. the zero sequence voltage corresponding to the voltage across the secondary winding and DC blocking capacitor. The third low pass filter 66 then filters this voltage. The third control term is then subtracted, in the fourth subtracting unit 68, from the low pass filtered zero sequence voltage in order to obtain a zero sequence voltage reference $u_{vze\_ref}$. This may then be used in converted into the ordinary voltage reference $uv_{x\_ref}$ used in a first control section in order to be used by the first control branch in forming the reference voltage signal.

The functionality of the second control section may also be described in the following way.

The phase leg output voltage $u_{vx}$; x=a, b, c, shown in FIG. 2 include a nominal DC component equal to $$\frac{u_d}{3}$$

and a fundamental frequency component equal to $u_{vx}^{(1)}$. Hence, the phase leg voltage, $$u_{vx} = \frac{u_d}{3} + u_{vx}^{(1)} = \gamma_x u_{cx}; x = a, b, c, \quad (5)$$

modulation reference, $$\gamma_a = \frac{\frac{1}{3}u_d + U_{va}^{(1)}\cos(\omega_1 t)}{u_{ca}}$$

and
sum of cell voltage, $$u_{ca} = \frac{21}{32}u_d + \frac{N_c}{2u_d\omega_1 C_c}[S_1\sin(\omega_1 t + \psi_1) - S_2\sin(2\omega_1 t + \psi_2)] \quad (6)$$

Multiplication of $\gamma_a$, consisting of $1^{st}$ order frequency term and $u_{ca}$, consisting of $1^{st}$ and $2^{nd}$ order frequency terms results in valve or phase leg voltage, $u_{va}$, consisting of $1^{st}$, $2^{nd}$ and $3^{rd}$ order frequency terms.

Analytically, $$u_{va} = \gamma_a u_{ca} = \left(\frac{\frac{1}{3}u_d + U_{va}^{(1)}\cos(\omega_1 t)}{\frac{21}{32}u_d}\right) \quad (7)$$

$$\left(\frac{21}{32}u_d + \frac{N_c}{2u_d\omega_1 C_c}[S_1\sin(\omega_1 t + \psi_1) - S_2\sin(2\omega_1 t + \psi_2)]\right)$$

-continued $$u_{va} = \frac{1}{3}u_d + U_{va}^{(1)}\cos(\omega_1 t) + \frac{16N_c}{63u_d\omega_1 C_c}$$

$$[S_1\sin(\omega_1 t + \psi_1) - S_2\sin(2\omega_1 t + \psi_2)] +$$

$$\frac{16N_c}{21u_d^2\omega_1 C_c}(U_{va}^{(1)}\cos(\omega_1 t))[S_1\sin(\omega_1 t + \psi_1) - S_2\sin(2\omega_1 t + \psi_2)]$$

To evaluate zero sequence performance, equating 3rd order frequency terms, $$u_{va}^{(3)} = \frac{-8N_c}{21u_d^2\omega_1 C_c}(U_{va}^{(1)}S_2)(\sin(3\omega_1 t + \psi_1 + \psi_2)) \quad (8)$$

Sum of valve voltages of three phases—

$$u_{va}^{(3)} + u_{vb}^{(3)} + u_{vc}^{(3)} = \sum u_{vx}^{(3)} = \frac{-24N_c}{21u_d^2\omega_1 C_c}(U_{vx}^{(1)}S_2) \quad (9)$$

Zero sequence third harmonic DC current can be given by, $$i_d^{(3)} = \frac{\sum u_{vx}^{(3)}}{h\omega_1(L_d + \sum L_x)} \quad (10)$$

Hence, zero sequence third harmonic DC current is dependent on sum of zero sequence third harmonic valve current, $i_{vz}^{(3)}$ or and $\Sigma u_{vx}^{(3)}$, $L_d$ and $\Sigma L_x$.

The above described operation has the following advantages.

Harmonics in the AC side zero sequence voltages as well as in the DC side pole mode current are minimized by applying modulation to the zero sequence converter voltage. It is furthermore simple, effective and stable in the complete operating range of the arrangement.

Figure 7:
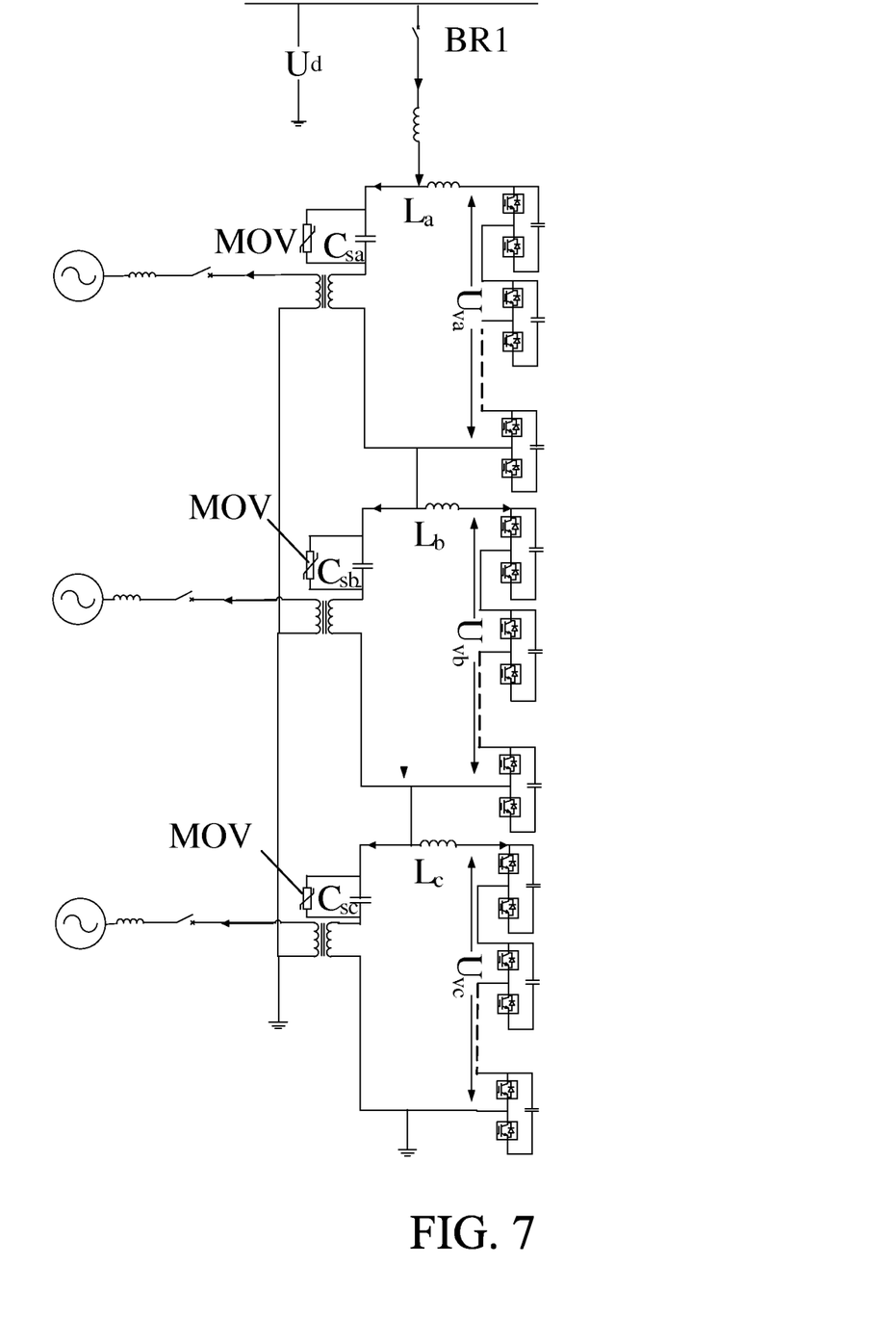
FIG. 7 shows a first alternative arrangement.

FIG. 7 shows an alternative arrangement according to a fourth embodiment. In this arrangement the control units have been left out. However, it should be realized that it may be included as well. A control unit may for instance comprise the first control section and/or the second control section.

Here there are surge arresters MOV in parallel with each string of cells. There is also a surge arrester MOV in parallel with each DC blocking capacitor $C_{sa}$, $C_{sb}$ and $C_{sc}$. More importantly though, the first branch of each power transfer module also comprises a reactor $L_a$, $L_b$ and $L_c$ in addition to the string of cells.

Also in the topology shown in FIG. 7 there is injection of 3rd order harmonic components in DC side currents as well as in AC side voltage. Due to the earlier mentioned ripple, the phase leg output voltage $u_{vx}$ will also contain harmonics in addition to the fundamental AC voltage.

The total voltage across three series connected phases will contain the DC voltage ($U_d$) and harmonics. Sum of the fundamental frequency component of three phases is zero.

$$U_{va} + U_{vb} + U_{vc} = U_d + \sum_{h=2}^{n} \hat{U}_h \sin(h\omega_1 t + \varphi_h) \quad (11)$$

Common mode 3rd order harmonic components of $U_h$ results in DC-side harmonic current and AC side harmonic voltages. Suppression of this was in the third embodiment achieved through modified zero sequence voltage reference as given in FIG. 3.

Connection of phase inductor in series with converter phase leg as shown in FIG. 7, reduces DC side harmonic currents from $$\frac{1}{h\omega_1(L_d)}$$

times to $$\frac{1}{h\omega_1(L_d + \sum Lx)}$$

times.

Resulting DC link current, $$I_d = I_{d0} + \sum_{h=2}^{n} \underbrace{\frac{1}{h\omega_1(L_d + \sum L_x)} \sum \hat{U}_h \sin(h\omega_1 t + \varphi_h)}_{u_h} \quad (12)$$

As can be seen there are two parallel current paths in each phase leg from DC pole to ground for the topology shown in FIG. 7. One is through DC blocking capacitor to converter side transformer winding and another is through string of cells and phase reactor. The realisation above suppresses harmonic generation in the arrangement through the use of the phase reactor $L_x$.

Hence, it can suppress 3rd order harmonics in above both parallel paths. This results in suppression of AC side and DC side harmonics at a same time.

Figure 8:
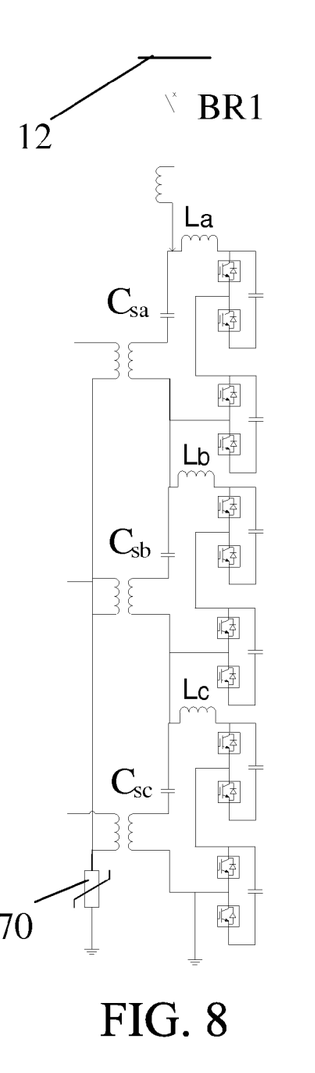
FIG. 8 shows a second alternative arrangement.

There are alternative ways in which the harmonics may be mitigated, where one according to a fifth embodiment is shown in FIG. 8. In this case there is surge arrester 70 connected to the primary windings of the transformer, which primary windings are again star connected.

This arrangement stops 3rd order harmonic voltages from appearing in the AC grid side transformer windings and converter side transformer windings. The topology cannot suppress 3rd order harmonic voltages generated by the cells and pole mode harmonic currents can flow on the DC side. Only 3rd order harmonic AC side voltage suppression is obtained.

Figure 9:
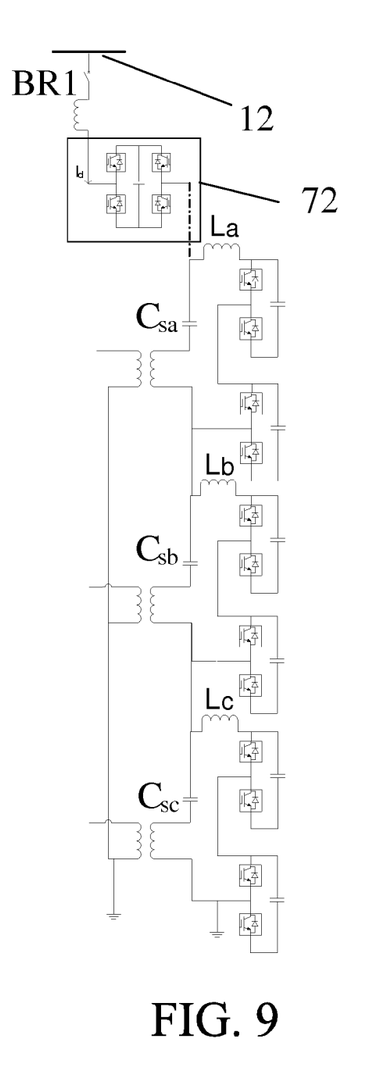
FIG. 9 shows a third alternative arrangement.

Another alternative according to a sixth embodiment is shown in FIG. 9. Here there is a group of full-bridge cells, at least comprising one full-bridge cell 72. The group is connected between the DC line 12 and the series connected phase legs or power transfer modules.

The full-bridge is in this embodiment used for active filtering of harmonics. The active filter using additional full-bridge (one or cascaded multi) is controlled to provide an AC voltage equal and opposite to common mode (3rd order) harmonic voltages generated in the phases. One or more of the control units may for this reason comprise a control element controlling the full-bridge cell for counteracting common mode harmonic voltages generated in the phase legs. This arrangement can suppress 3rd order DC side current harmonics but cannot suppress 3rd order AC side voltage harmonics. Transformer windings on converter side and AC grid side will see 3rd order voltage harmonics.

The invention according to the third-sixth embodiments have a number of further advantages.

It provides filtering in an economical way, which is of advantage wherever installation cost and space concerns are higher for 3rd order harmonic passive filters on AC side and DC side. It is also advantageous in countries where strict grid codes are applied for 3rd order harmonic injection The invention according to the third-sixth embodiments avoid additional bulky and costly low order (3rd order) harmonic filters on AC and DC side as well as provides stable and minimum 3rd order harmonic (AC side voltage and DC side current) operation in entire operating range of the arrangement.

Figure 10:
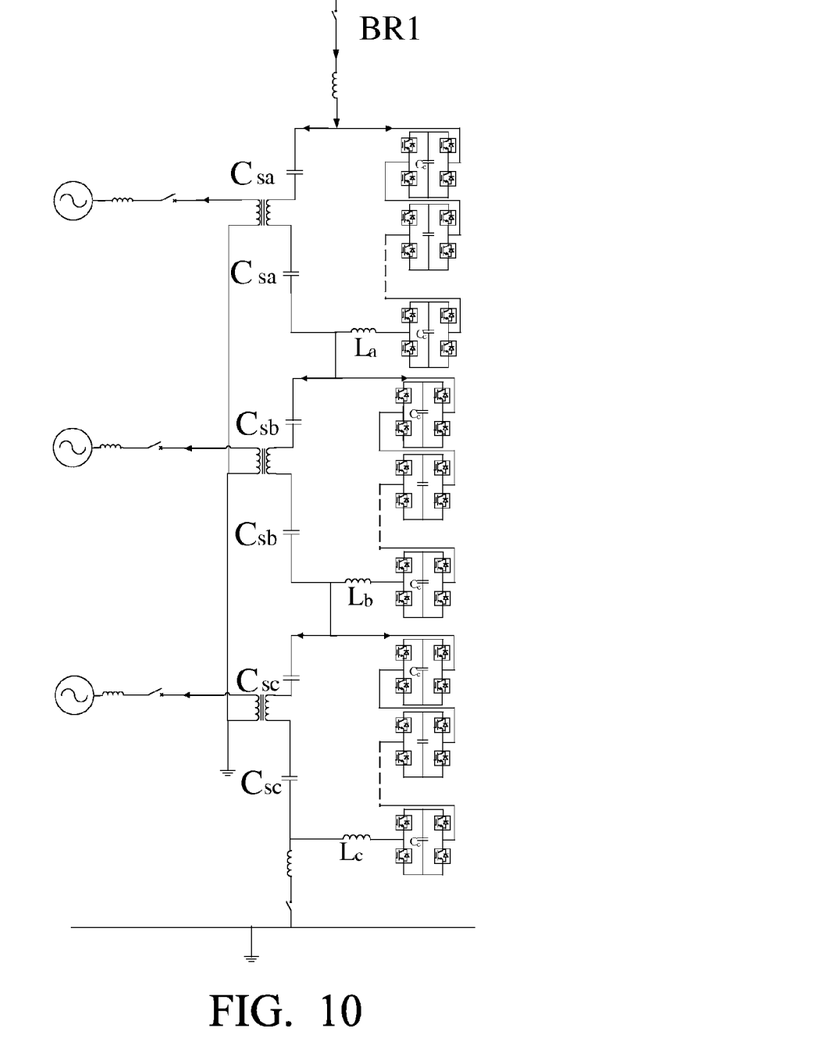

Another alternative arrangement is shown in FIG. 10. In this case the cells in the first branches of the modules are full-bridge cells. In this case each second branch comprises two DC blocking capacitors, one on each side of the secondary winding.

The invention can be modified in several ways. The harmonic filtering of the third to sixth embodiments may all be combined with each other as well as with either the control strategies of the first or second embodiments. It is possible to mix half-bridge and full-bridge cells in the first branches.

Figure 11:
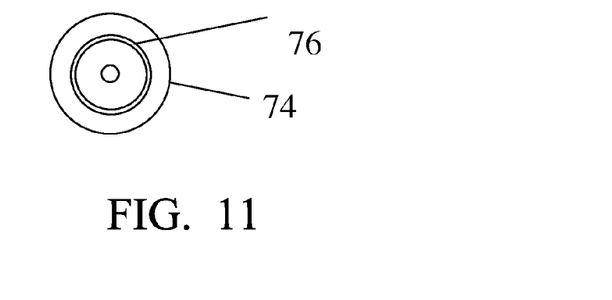

The control units may be realized in the form of discrete components. However, they may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. One such data carrier in the form of a CD Rom disk 74 carrying computer program code 76 is shown in FIG. 11.

From the foregoing discussion it is evident that the present invention can be varied in a multitude of ways. It shall consequently be realized that the present invention is only to be limited by the following claims.

The invention claimed is:

1. An arrangement for converting between alternating current, AC, and direct current, DC, said arrangement comprising:

a number of power transfer modules connected in series between two DC potentials, where one DC potential is the voltage of a DC power line and each power transfer module comprises a first branch comprising a string of converter cells, wherein a cell provides a voltage contribution of a cell capacitor or zero, said first branch being connected in parallel with a second branch comprising a capacitor and a secondary winding of a transformer, the primary winding of which is connected to a corresponding AC phase of an AC network;

at least one control unit comprising:
an adding unit configured to:
obtain an AC voltage reference and a DC dependent control contribution, said DC dependent control contribution being based on a DC voltage term depending on the number of power transfer modules and on the difference between the two DC potentials; and add the DC dependent control contribution to the AC voltage reference for forming a first control expression; and a dividing unit configured to:
obtain the first control expression;
obtain a cell voltage reference sum for use in a second control expression, where the cell voltage reference sum is a sum of cell capacitor voltage references provided for a corresponding power transfer module; and
divide the first control expression with the second control expression in order to obtain a reference voltage signal for use in PWM control of the cells of the string of a corresponding power transfer module, where the signal is compared with a triangular carrier wave.

2. The arrangement according to claim 1, wherein said DC voltage term is used as the DC dependent control contribution.

3. The arrangement according to claim 2, wherein a string of converter cells of a power transfer module forms a phase leg and the control unit further comprising:
a processing unit configured to obtain a phase leg current and process the phase leg current for obtaining a third control term only based on harmonic components of the phase leg current;
another further subtracting unit configured to obtain a second branch voltage and the third control term and subtract the third control term from the second branch voltage in order to obtain a zero sequence reference voltage to be used for forming said reference voltage signal.

4. The arrangement according to claim 1, wherein the adding unit is further configured to add a zero sequence reference voltage to the DC dependent control contribution and the AC voltage reference for forming the first control expression, the control unit further comprising a further subtracting unit configured to obtain a second branch voltage without fundamental frequency component, the DC voltage term and subtract the second branch voltage without fundamental frequency component from the DC voltage term in order to obtain the DC dependent control contribution.

5. The arrangement according to claim 1, wherein a string of converter cells of a power transfer module forms a phase leg and the control unit further comprising:
a processing unit configured to obtain a phase leg current and process the phase leg current for obtaining a third control term only based on harmonic components of the phase leg current; and
another further subtracting unit configured to obtain a second branch voltage and the third control term and subtract the third control term from the second branch voltage in order to obtain a zero sequence reference voltage to be used for forming said reference voltage signal.

6. The arrangement according to claim 5, wherein the phase leg current is a zero sequence component of the phase leg current and the second branch voltage is a zero sequence component of the second branch voltage.

7. The arrangement according to claim 5, wherein the processing unit comprises a low pass filter and a subtracting unit, the low pass filter being connected to a negative input of the subtracting unit, where the phase leg current is received by an input of the low pass filter and a positive input of the subtracting unit.

8. The arrangement according to claim 1, further comprising at least one full-bridge cell connected between the DC power line and the series connected power transfer modules, the control unit further comprising a control element controlling the full-bridge cell for counteracting common mode harmonic voltages generated in the phase legs.

9. The arrangement according to claim 1, further comprising a reactor in each power transfer module, said reactor being connected in the first branch together with the string of cells.

10. The arrangement according to claim 1, further comprising a surge arrester connected in series with all the primary windings.

11. The arrangement according to claim 1, wherein the cells in the string of cells comprise half-bridge converter cells.

12. Arrangement according to claim 1, wherein the cells in the string of cells comprise full-bridge converter cells.

13. Arrangement according to claim 1, wherein the number of modules are more than two.

14. A method of controlling a power transfer module for converting between alternating current, AC, and direct current, DC, the power transfer module being a power transfer module in a group of power transfer modules connected in series between two DC potentials, where one DC potential is the voltage of a DC power line and each power transfer module comprises a first branch comprising a string of converter cells, wherein a cell provides a voltage contribution of a cell capacitor or zero, said first branch being connected in parallel with a second branch comprising a capacitor and a secondary winding of a transformer, the primary winding of which is connected to a corresponding AC phase of an AC network, the method comprising:
obtaining an AC voltage reference;
obtaining a DC dependent control contribution, said DC dependent control contribution being based on a DC voltage term depending on the number of power transfer modules and the difference between the two DC potentials;
adding the DC dependent control contribution to the AC voltage reference for forming a first control expression;
obtaining a cell voltage reference sum for use in a second control expression, where the cell voltage reference sum is a sum of cell capacitor voltage references provided for a corresponding power transfer module;
dividing the first control expression with the second control expression for obtaining a reference voltage signal for PWM control; and
PWM controlling the cells of the string of the power transfer module using said reference voltage signal as a control signal in PWM control of these cells where the signal is compared with a triangular carrier wave.

15. The method according to claim 14, wherein said DC voltage term is used as the DC dependent control contribution.

16. The method according to claim 14, wherein the adding of the DC dependent control contribution to the AC voltage reference comprises adding the DC dependent control contribution to a sum of the AC voltage reference and a zero sequence reference voltage and further comprising processing the DC voltage term through subtracting a second branch voltage without fundamental frequency component from the DC voltage term in order to obtain the DC dependent control contribution.

17. The method according to claim 14, wherein a string of converter cells of a power transfer module forms a phase leg and further comprising:

obtaining a second branch voltage;

obtaining a phase leg current;

processing the phase leg current for obtaining a third control term only based on harmonic components of the phase leg current; and subtracting the third control term from the second branch voltage in order to obtain a zero sequence reference voltage for use in forming the reference voltage signal.

18. The method according to claim 17, wherein the second branch voltage is a zero sequence component of the second branch voltage and the phase leg current is a zero sequence component of the phase leg current.

19. The method according to claim 14, the arrangement further comprising at least one full-bridge cell connected between the DC power line and the series connected power transfer modules, the method further comprising controlling the full-bridge cell for counteracting common mode harmonic voltages generated in the phase legs.

20. A computer program product for controlling a power transfer module for converting between alternating current, AC, and direct current, DC, the power transfer module being a power transfer module in a group of power transfer modules connected in series between two DC potentials, where one DC potential is the voltage of a DC power line and each power transfer module comprises a first branch comprising a string of converter cells, wherein a cell provides a voltage contribution of a cell capacitor or zero, said first branch being connected in parallel with a second branch comprising a capacitor and a secondary winding of a transformer, the primary winding of which is connected to a corresponding AC phase of an AC network, the computer program product comprising a non-transitory data carrier with computer program code configured to cause a control unit to:

obtain an AC voltage reference;

obtain a DC dependent control contribution, said DC dependent control contribution being based on a DC voltage term depending on the number of power transfer modules and the difference between the two DC potentials;

add the DC dependent control contribution to the AC voltage reference for forming a first control expression;

obtain a cell voltage reference sum for use in a second control expression, where the cell voltage reference sum is a sum of cell capacitor voltage references provided for a corresponding power transfer module;

divide the first control expression with the second control expression for obtaining a reference voltage signal for PWM control; and PWM control the cells of the string using said reference voltage signal as a control signal in PWM control of these cells where the signal is compared with a triangular carrier wave.

* * * * *